Figure 3:
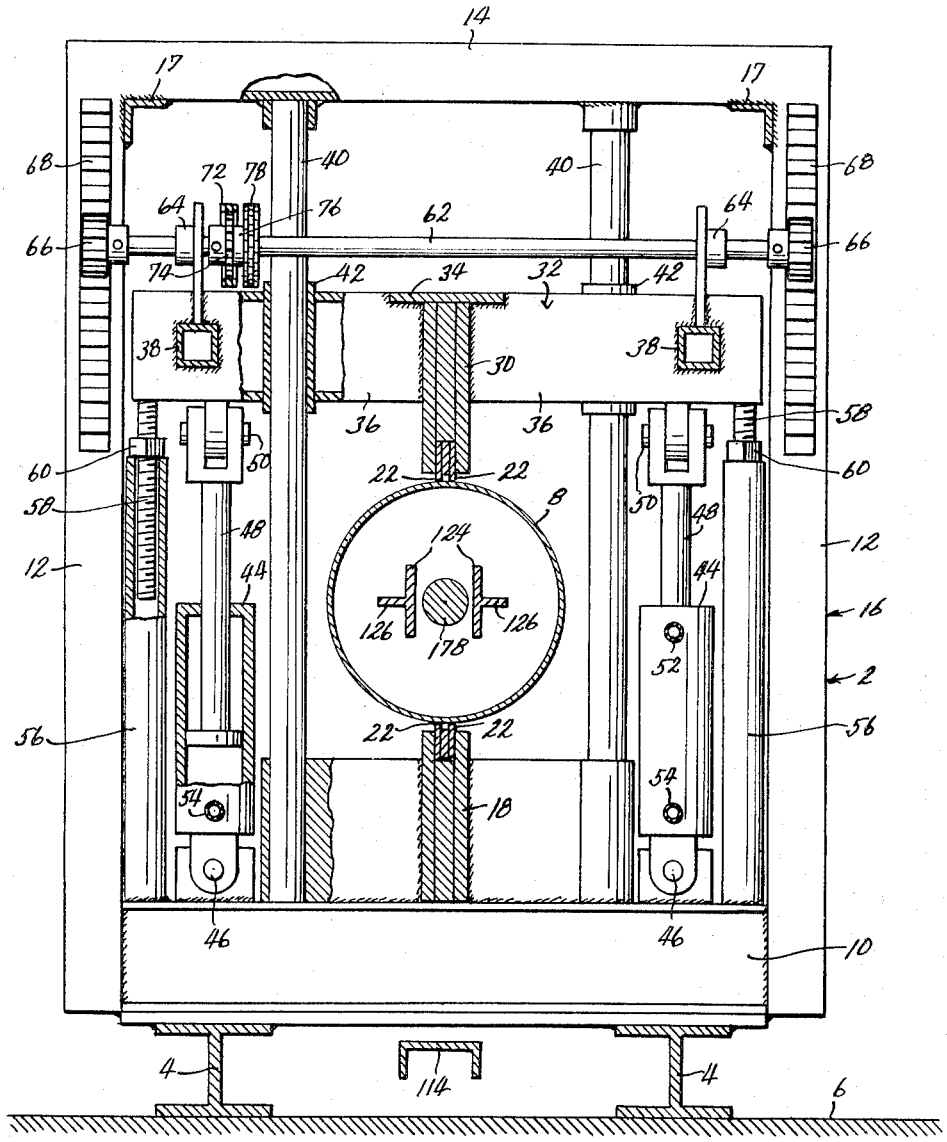

United States Patent
Brown et al.

[15] 3,678,718
[45] July 25, 1972

[54] PIPE PERFORATING MACHINE

[72] Inventors: William A. Brown, 2021 Hart St.; Eugene P. Earnest, 203½ W. Wyatt Earp Bldg., both of Dodge City, Kans. 67801

[22] Filed: Dec. 4, 1970

[21] Appl. No.: 95,254

[52] U.S. Cl. .............................. 72/71, 72/326, 83/54, 83/185, 83/191
[51] Int. Cl. .................... B21d 31/02, B23b 3/06, B23b
[58] Field of Search ............... 72/326, 332, 113, 71, 204, 72/203; 83/187, 185, 191, 54

[56] References Cited

UNITED STATES PATENTS

| | | | |
|---|---|---|---|
| 3,156,285 | 11/1964 | Layne | 72/71 |
| 3,540,258 | 11/1970 | Branson | 72/324 |

Primary Examiner—Charles W. Lanham
Assistant Examiner—R. M. Rogers
Attorney—John A. Hamilton

[57] ABSTRACT

A machine for perforating a cylindrical pipe consisting of a frame operable to support said pipe between diametrically opposed pairs of shear blades carried by said frame and extending longitudinally of said pipe, a head carried by said frame for powered movement through said pipe parallel to the axis thereof, and a pair of cutter wheels carried rotatably by said head on axes transverse to said pipe and having rolling engagement with the interior of said pipe respectively in alignment with one of said pairs of shear blades, each of said wheels having a series of angularly spaced cutter teeth projecting radially outwardly therefrom by a distance greater than the wall thickness of said pipe, each of said teeth being operable, as said wheel rolls through said pipe, to cooperate with the associated shear blades to cut a pair of short parallel slits longitudinally in the pipe wall, and to offset outwardly the wall section between said slits.

17 Claims, 14 Drawing Figures

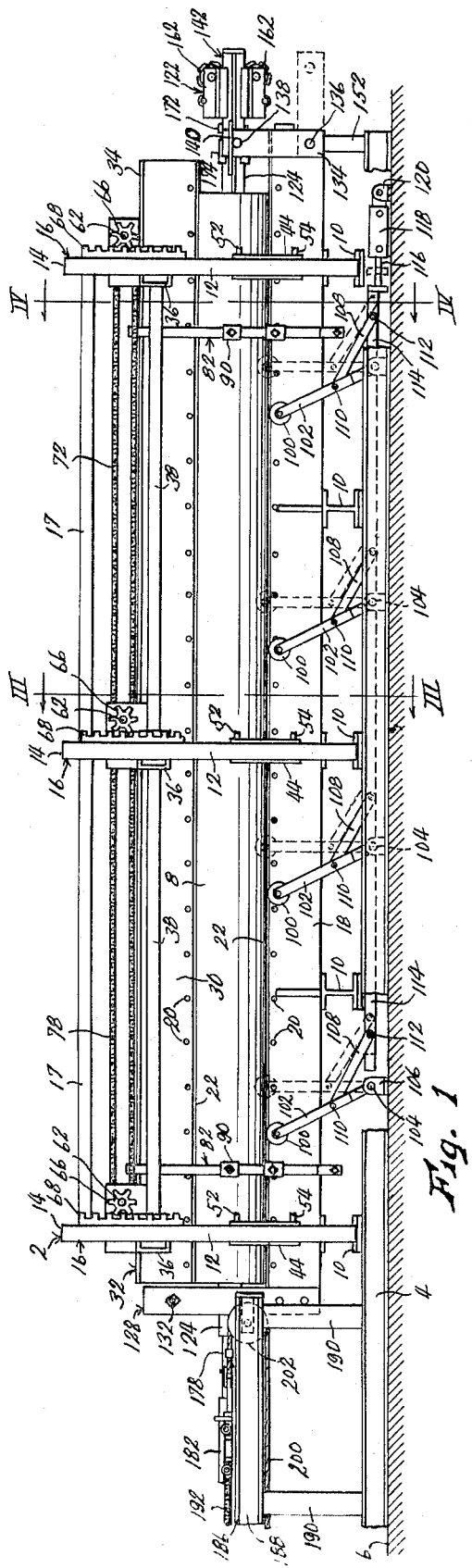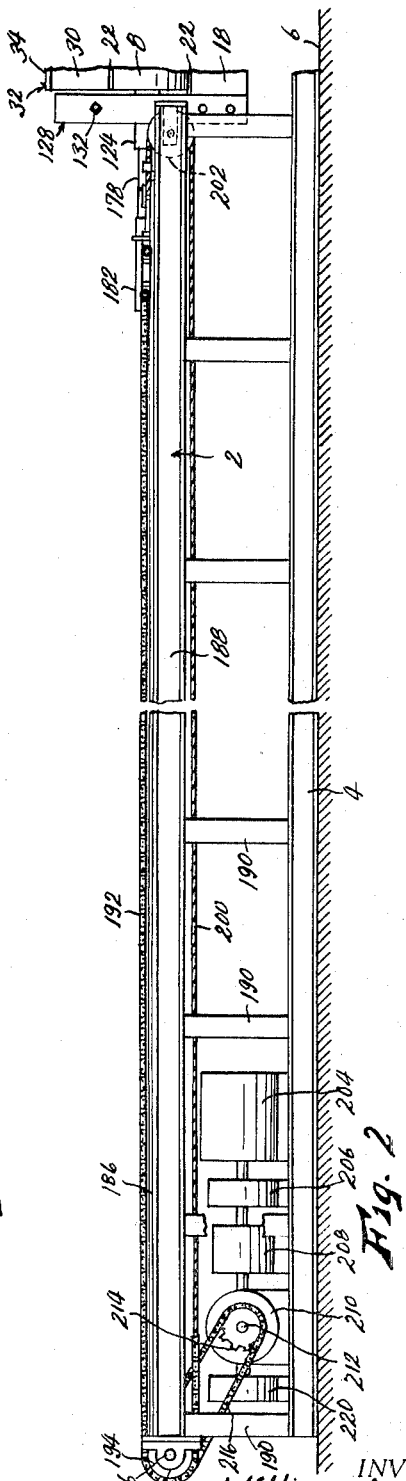

INVENTORS.
William A. Brown
Eugene P. Earnest
BY John A. Hamilton
Attorney.

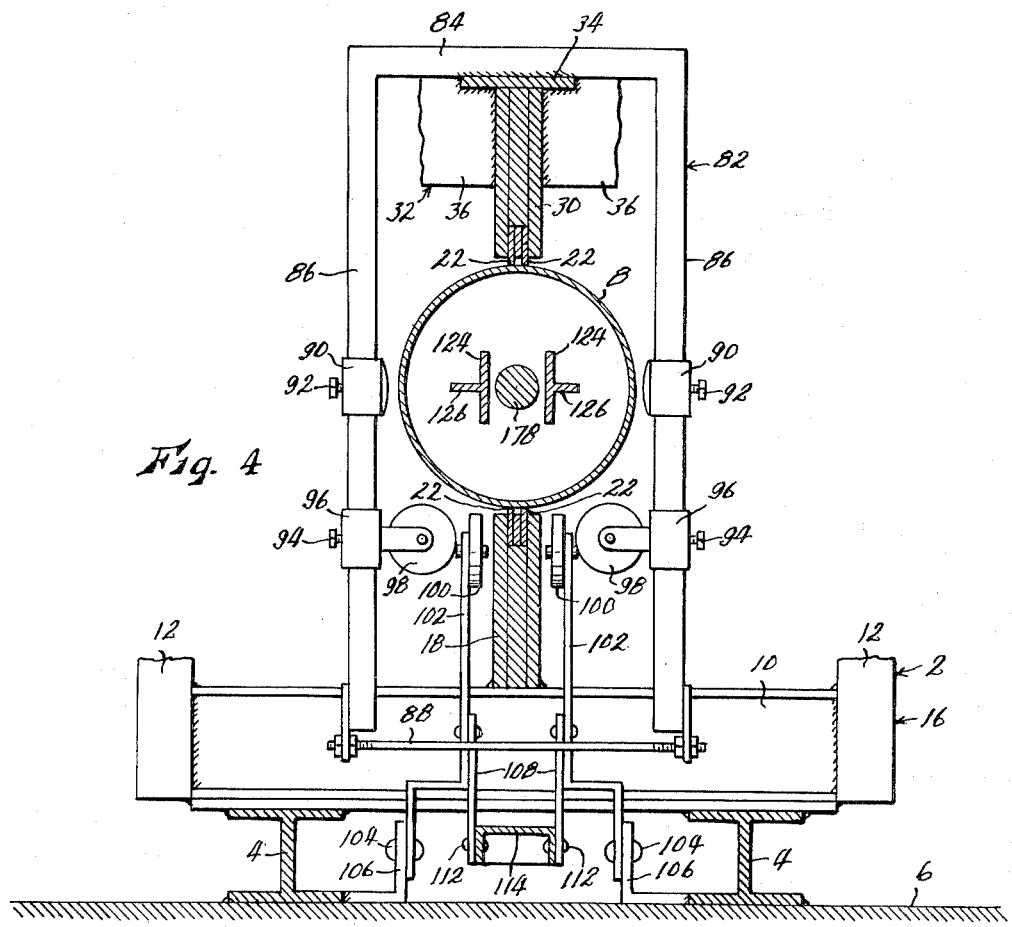
Fig. 4
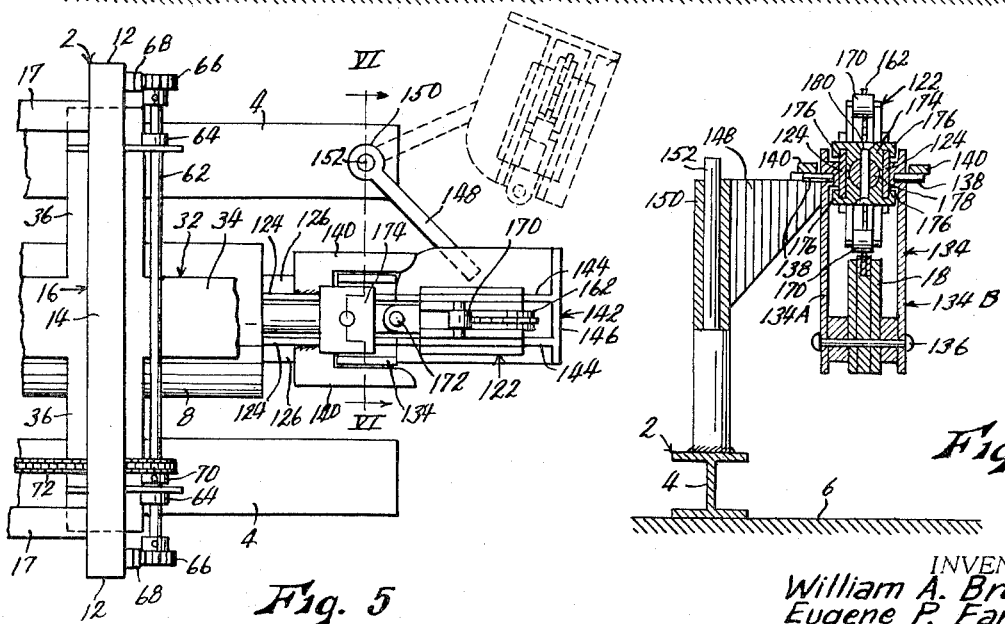
Fig. 5
Fig. 6
INVENTORS.
William A. Brown
Eugene P. Earnest
BY John A. Hamilton
Attorney.

INVENTORS.
William A. Brown
Eugene P. Earnest
BY John A. Hamilton
Attorney.

Patented July 25, 1972

3,678,718

5 Sheets-Sheet 5

INVENTORS.
William A. Brown
Eugene P. Earnest
BY John A. Hamilton
Attorney.

PIPE PERFORATING MACHINE

This invention relates to new and useful improvements in pipe perforating machines, and has particular reference to the production of perforated pipe for use in water wells, said pipe being utilized in sections of a well casing within the water bearing formation, in order to admit water preparatory to pumping it to the ground surface.

An important object of the present invention is the provision of a machine capable of perforating pre-formed cylindrical pipe. This is a considerable advantage in economy over the present method in general usage, which consists of perforating flat sheets of plate stock, then forming and securing said sheets in pipe form. Generally, this object is accomplished by disposing the pipe between a pair of diametrically opposed, longitudinally extending rails in the confronting edges of each of which are affixed a pair of parallel, spaced apart shear blades, and moving a cutter head having a pair of wheels mounted therein each adapted to roll along the interior surface of said pipe in alignment with one of said pairs of shear blades, each of said wheels having a series of angularly spaced teeth projecting outwardly therefrom each adapted, in cooperation with said shear blades, to cut a pair of parallel slits longitudinally in the pipe wall, and to offset the portion of the pipe wall intermediate said slits outwardly a distance greater than the pipe wall thickness.

Another object is the provision of a perforating machine operable to form a particularly advantageous type of perforation, in that said perforations provide a large area for the flow of water therethrough, in proportion to the total wall area of the pipe, but at the same time may be so restricted in dimension as to prevent the entry of gravel, sand or the like into the pipe. To this end, the actual perforations consist of long but narrow slits, the width of which may be closely regulated as desired.

A further object is the provision of a pipe perforating machine of the character described having certain novel advantages of operation in connection with what may be termed "pipe handling," and including introduction of the pipe into the machine, transverse relative movability of the shear blade rails to permit easy insertion of the pipe and rotation thereof to index it angularly to be perforated along successive pairs of diametrically opposite lines by said cutter wheel teeth, and the removal of the pipe after perforation thereof is completed.

Other objects are simplicity and economy of construction, and efficiency and dependability of operation.

Figure 7:
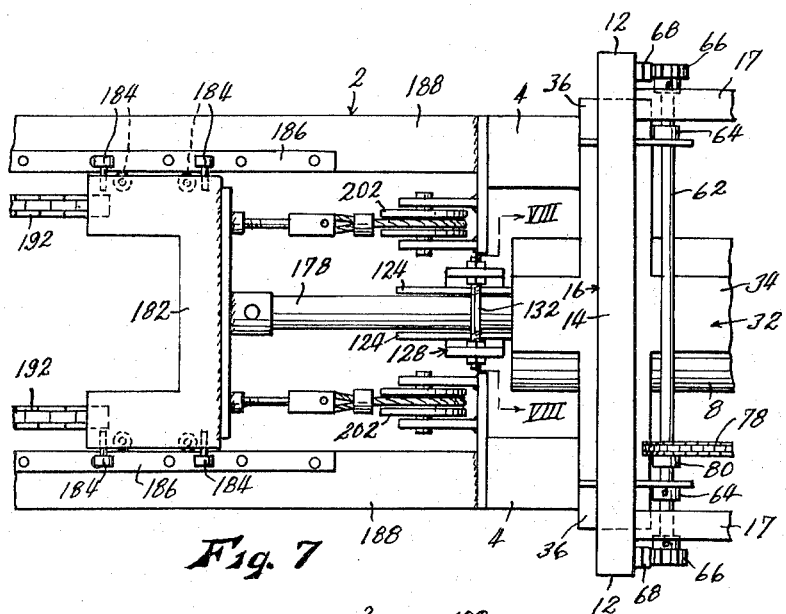
Figure 8:
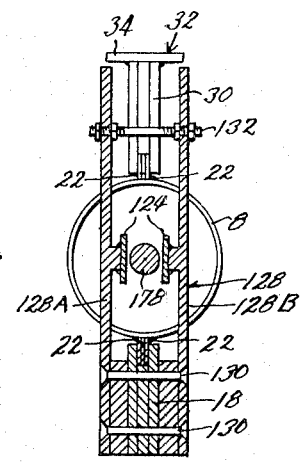
Figure 9:
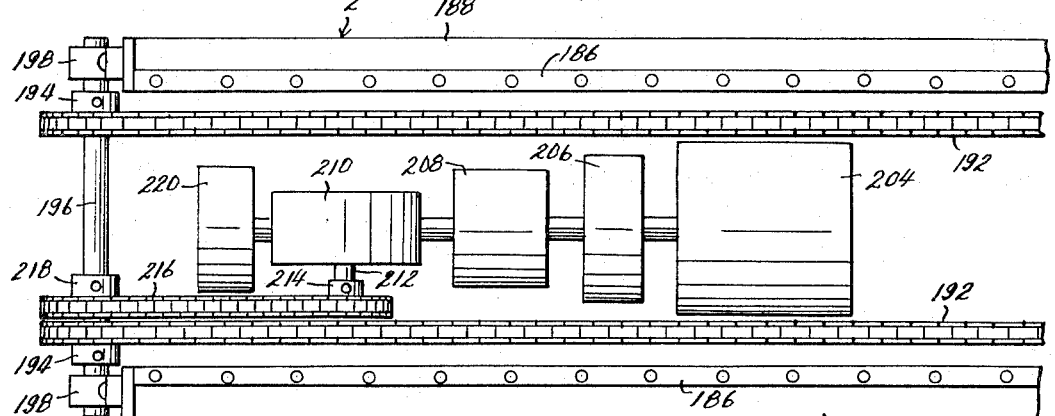
Figure 10:
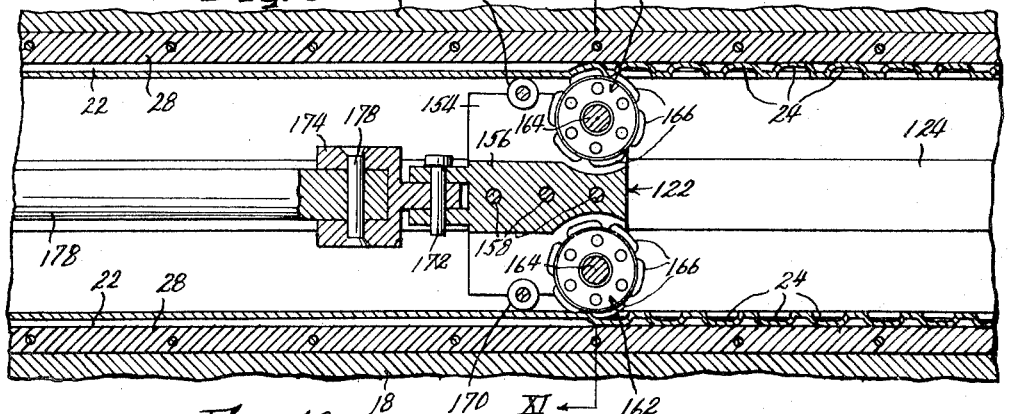
Figure 11:
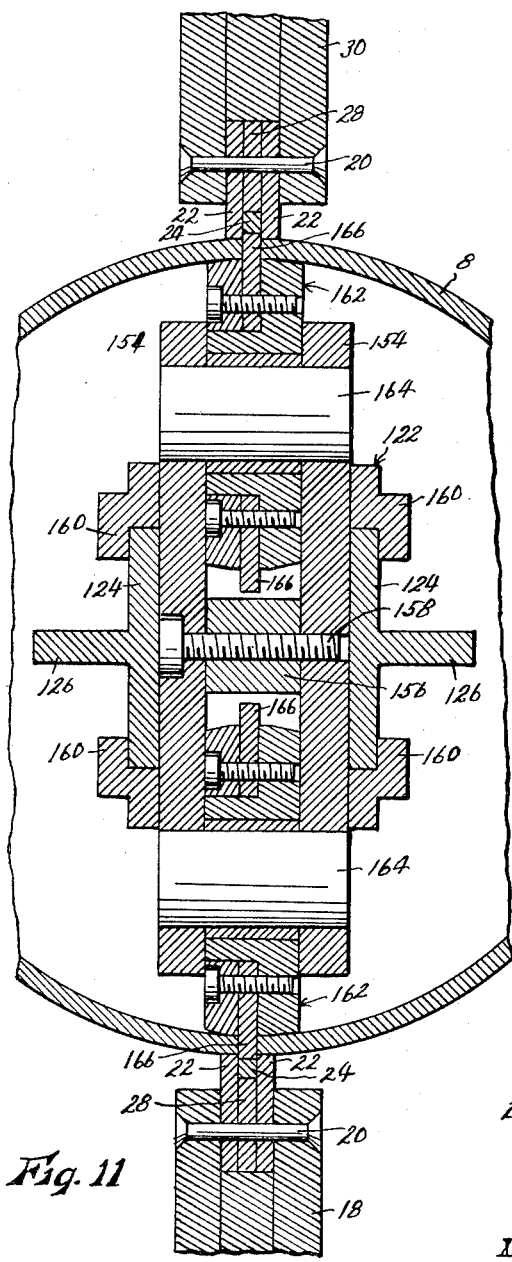
Figure 12:
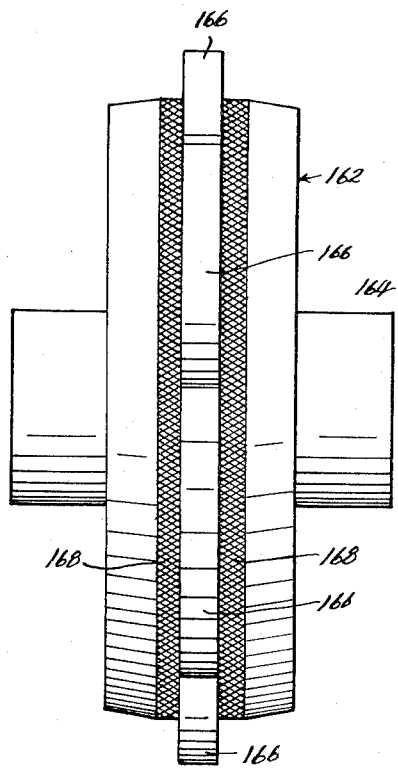
Figure 14:
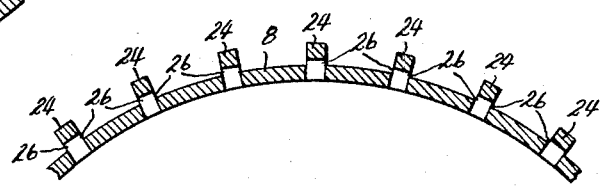
Figure 13:
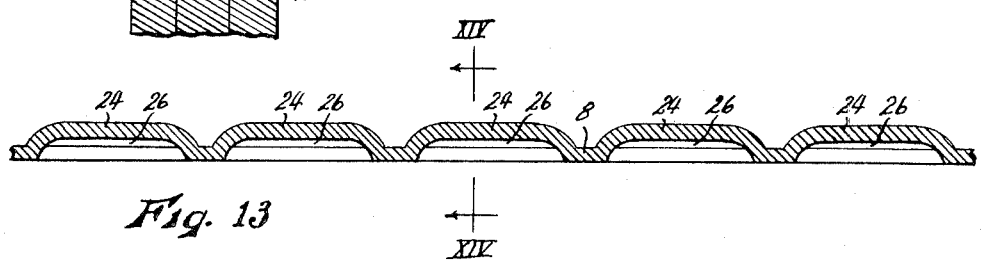

With these objects in view, as well as other objects which will appear in the course of the specification, reference will be had to the accompanying drawing, wherein:

FIG. 1 is a side elevational view of the right end portion of a pipe perforating machine embodying the present invention, FIG. 2 is a side elevational view, somewhat foreshortened, of the left end portion of the machine as shown in FIG. 1, being a leftward extension of FIG. 1, FIG. 3 is an enlarged sectional view taken on line III—III of FIG. 1, with parts broken away, FIG. 4 is an enlarged sectional view taken on line IV—IV of FIG. 1, FIG. 5 is an enlarged top plan view of the extreme right end portion of FIG. 1, showing the cutter head carrier in operative position in solid lines, and in its inoperative position in dotted lines, FIG. 6 is a sectional view taken on line VI—VI of FIG. 5, FIG. 7 is an enlarged top plan view of the extreme left end portion of FIG. 1, FIG. 8 is a sectional view taken on line VIII—VIII of FIG. 7, FIG. 9 is an enlarged top plan view of the left end portion of FIG. 2, FIG. 10 is a fragmentary longitudinal sectional view of the pipe and related elements of the machine, showing the cutter head as it moves through the pipe in the operation of the machine, FIG. 11 is a an enlarged, fragmentary sectional view taken on line XI—XI of FIG. 10, FIG. 12 is still further enlarged edge view of one of the cutter wheels, FIG. 13 is a fragmentary, enlarged longidudinal sectional view of a wall of the pipe, showing the form of the perforations made by the machine, and FIG. 14 is a fragmentary sectional view taken on line XIV—XIV of FIG. 13.

Like reference numeral apply to similar parts throughout the several views, and the numeral 2 applies generally to the main frame of the machine. Said main frame includes a pair of parallel, spaced apart I-beams 4 extending the full length of the machine and securely affixed to the floor 6 by any suitable means. At the right end of the machine, as shown in FIG. 1, which may be termed its forward end and which corresponds generally in length to that of the cylindrical pipe 8 to be perforated, a series of cross bars 10, also constituting I-beams, extend horizontally and transversely across I-beams 4, and are welded or otherwise securely affixed thereto. Affixed to each end of certain of cross bars 10 is a vertical post 12 which extends upwardly, and the upper ends of said posts are rigidly interconnected by a horizontal, transversely extending cross bar 14. Each pair of posts 12 and its associated cross bar 14 constitute a bridge member further designated generally by the numeral 16. As shown, there are three bridge members, one adjacent but spaced inwardly from each end of pipe 8 when said pipe is in the machine as shown in FIG. 1, and one midway between said end bridges. The upper ends of said bridge members may be braced by horizontal stringers 17 extending therebetween longitudinally of the machine. An elongated lower rail 18 extends along the midline of the machine, being supported on cross bars 10 and welded or otherwise rigidly affixed thereto, and is of somewhat greater length than pipe 8. Said rail is of great strength and rigidity to resist vertical flexure thereof, being of rectangular cross-sectional contour with its major axis arranged vertically. Set into the upper edge of said rail, and affixed therein as by rivets 20 (See FIG. 11) are a pair of parallel, spaced apart shear blades 22 extending substantially the full length of the rail.

Before describing the machine further, reference should be had first to FIGS. 13 and 14, showing the pipe as eventually perforated. As there shown, narrow longitudinal strips 24 are offset outwardly from the cylindrical contour of the pipe by a distance greater than the wall thickness of the pipe, thereby forming narrow slit openings 26, which may be termed the perforation openings, along each side of each strip 24. Shear blades 22 are spaced transversely apart by a spacer plate 28, the thickness of said spacer plate corresponding to the desired transverse width of pipe strips 24, and the upper edge of said spacer plate is spaced below the upper edges of blades 22 by a distance equal to the desired outward offset of strips 24. Blades 22 are of course formed of high quality tool steel.

A top rail 30 corresponding to lower rail 18, and carrying corresponding shear blades 22 and spacer plate 28 mounted in the lower edge thereof, is disposed above and parallel to said lower rail, said upper rail also being of greater length than pipe 8, but somewhat less than the length of lower rail 18. Said upper rail is affixed to an auxiliary frame designated generally by the numeral 32, and consisting of a horizontal bar 34 extending the full length of rail 30, and to the lower surface of which said rail is welded or otherwise affixed, and a series of cross beams 36 of box form welded to and extending horizontally and transversely from opposite sides of rail 30. Cross beams 36 are arranged in aligned pairs at opposite sides of rail 30, each pair being aligned with one of bridge members 16 and disposed directly beneath cross bar 14 of said bridge member. The outer ends of beams 36 at each side of the rail may be connected by stringer beams 38 extending therebetween longitudinally of the machine and welded thereto.

Auxiliary frame 32 is supported, guided, and powered for vertical movement by means best shown in FIG. 3, which shows the means provided for these purposes at the center bridge member 16, although it will be understood that similar means are provided at each of the bridge members. At each side of pipe 8, there is disposed a vertical post 40 affixed at its lower end to the associated I-beam cross bar 10, and at its upper end to the cross bar 14 of the associated bridge member 16. A pair of sleeves 42 fixed in the cross bars 36 of the auxiliary frame 32 at that bridge member are respectively slidably mounted on the two posts 40, whereby said posts guide said auxiliary frame in its vertical movement. At each side of pipe 30, there is also disposed a vertical hydraulic ram, the cylinder 44 of said ram being connected at its lower end, as at 46, to cross bar 10, and the upper end of the piston rod 48 thereof being secured, as at 50, to the associated cross bar 36 of the auxiliary frame. Each of cylinders 44 is double-acting, having a top inlet 52 for hydraulic fluid whereby the ram is shortened to lower the auxiliary frame, and a bottom inlet 54 for hydraulic fluid whereby the ram is lengthened to raise the auxiliary frame. All of cylinders 44 receive hydraulic fluid from a common source, the pumping and valving arrangement thereof being standard and not here shown.

To insure that auxiliary frame 32 is level, and that shear blades 22 carried by upper rail 30 are straight and parallel with blades 22 of the lower rail, when the auxiliary frame is lowered to grip pipe 8 between said upper and lower sets of shear blades as shown in FIG. 3, there is also provided at each side of said pipe a vertical post 56 fixed at its lower end to cross bar 10, and having inserted in its tubular upper end an adjusting screw 58 on which is threaded a heavy nut 60 abutting the top of the post. By turning said nuts, the upward extension of screws 58 may be adjusted. The cross bars 36 of auxiliary frame 32 abut the upper ends of said screws when the auxiliary frame is lowered by the hydraulic rams. If screws 58 are properly adjusted, they insure that upper rail 30 will then be straight and in true parallelism with lower rail 18. Otherwise these conditions might not occur, since even though top rail 30 is very strong, it must commonly be at least 20 feet long and therefore might still flex appreciably under the enormous stress applied thereto in the use of the machine, and futhermore since there can be no guarantee that all of cylinders 44 will act in precisely the same degree. Preferably, screws 58 are so set that when they are engaged by the auxiliary frame, the upper and lower sets of shear blades 22 not only engage pipe 8, but slightly flatten said pipe in a vertical direction. This tends to insure continuous linear contact between the shear blades and the pipe in case the pipe is normally out of round or of varying diameter. Screws 58 also insure a fixed spacing between the upper and lower shear blades regardless of small variations of diameter in the pieces of pipe to be perforated, in order that they may cooperate accurately with the cutter head, as will be described.

In order to insure that auxiliary frame 32 will remain substantially level and unflexed when it is raised by hydraulic cylinders 44, despite any tendency of said cylinders to act unequally, there is provided, at each bridge member 16 a transverse horizontal shaft 62 rotatably journalled in bearings 64 mounted on the cross bars 36 of the auxiliary frame 32 associated with that bridge member. A gear pinion 66 is fixed on each end of each of said shafts, and each pinion is operatively meshed with a gear rack 68 fixed on the adjacent upright post 12 of the corresponding bridge member 16. Considering the end of the machine at the right end of FIG. 1 as its forward end, the shaft 62 of the forward bridge member has affixed thereon a sprocket 70 (see FIG. 5) operatively connected by a sprocket chain 72 with a sprocket 74 (see FIG. 3) fixed on shaft 62 of intermediate bridge member 16, and a second sprocket 76 fixed on the latter shaft is operatively connected by a sprocket chain 78 with a sprocket 80 (see FIG. 7) fixed on the shaft 62 of rear bridge member 16. This rack, gear and chain arrangement defeats any tendency of cylinders 44 to act unequally as they raise and lower the auxiliary frame.

A pair of hangers 82 of inverted U-form are carried by auxiliary frame 32 respectively adjacent the forward and rearward ends thereof, just inside of the forward and rearward bridges 16. As best shown in FIG. 4, each of said hangers includes a top cross bar 84 extending transversely over the top bar of the auxiliary frame, and being welded thereto, and a pair of legs 86 depending from the ends of said cross bar, respectively at opposite sides of pipe 8, to the level of cross bars 10 of the main frame, where they are connected by a tie bolt 88 extending transversely therebetween beneath lower rail 18, whereby to prevent spreading of their lower ends. A pipe guide 90 is mounted slidably on each of legs 86, and is fixed thereon by a set screw 92. These guides prevent the pipe from rolling laterally off of the shear blades 22 of lower rail 18 at certain stages of the operation, as will appear. Also mounted on each of legs 90, and fixed thereon by set screws 94, is a slide 96 carrying a roller wheel 98 for rotation on an axis parallel to pipe 8, said wheels being disposed inwardly of legs 86 so as to lie beneath pipe 8. During the perforation operation said wheels are spaced below and do not engage said pipe, but are raised by the elevation of auxiliary frame 32 to engage and lift said pipe above rail 18, and thereafter support said pipe for rotation about its axis.

Since pipe 8 is inserted longitudinally into the machine from the forward end of said machine, and removed in a forward direction, rollers are needed for supporting the pipe during these movements. Accordingly, there are provided at intervals along the length of lower rail 18 a series of is of roller wheels 100 (see FIGS. 1 and 4), the wheels of each pair being disposed respectively at opposite sides of rail 18, beneath pipe 8, with their axes transverse to said pipe. Each roller wheel 100 is carried rotatably at the upper end of an arm 102 extending dowardly and pivoted at its lower end, as at 104, to a bracket 106 affixed to one of I-beams 4 of the main frame, pivots 104 being horizontal and transverse to pipe 8. A link 108 is pivoted, as at 110, to each of arms 102 in spaced relation above pivot 104, and extends downwardly and forwardly. The lower ends of each of links 108 is pivoted, as at 112, to an elongated bar 114 extending longitudinally of the machine beneath cross bars 10 of the main frame. The forward end of bar 114 (see FIG. 1) is affixed to the piston rod 116 of a hydraulic cylinder 118 mounted on the main frame by bracket 120. Cylinder 118 is double-acting, whereby bar 114 may be moved either forwardly or rearwardly, and is furnished with hydraulic fluid when desired by standard means not shown. When is a 114 is moved rearwardly, roller wheels 100 take the positions shown in solid lines in FIG. 1 and in FIG. 3, being lowered sufficiently to allow pipe 8 to rest on the blades 22 of lower rail 18. When bar 114 is moved forwardly by cylinder 118, wheels 100 are raised as shown in dotted lines in FIG. 1 to support pipe 8 above rail 18 for longitudinal rolling movement.

A cutter head 122, to be more fully described below, is supported for movement longitudinally by a pair of ways 124 extending the full length of the pipe and outwardly from the ends thereof. Each of said ways constitutes an elongated plate disposed in a vertical plane, and they are spaced laterally apart, each being reinforced by a rib 126 affixed to its outer surface. At their rearward ends, said ways are permanently and rigidly affixed to a vertical post 128 which is affixed at its lower end to the rearward end of rail 18. As best shown in FIG. 8, post 128 is actually double, the members 128 A and 128 B being affixed at their lower ends to rail 18 by rivets 130, and extending upwardly respectively at the distally opposite sides of ways 124, so as not to obstruct the space between said ways, and so as to leave the upper and lower edge portions of said ways unimpeded. Also, post members 128 A and 128 B extend above said ways and are connected at their upper ends by a transverse tie bolt 132 to prevent possible spreading of the ways.

The ways 124 extend forwardly through the entire length of pipe 8, parallel to the axis thereof, and outwardly from the forward end thereof. While strongly built, they would sag at their forward ends if not supported at that point, due to their length. For this reason, a post 134, double in the manner of post 128 and having sections 134 A and 134 B, as shown in FIGS. 5 and 6, is pivoted at its lower end, as at 136, to the forward end of lower rail 18, and normally projects upwardly therefrom as shown in solid lines in FIG. 1, having fixed in the upper ends of sections 134 A and 134 B thereof a pair of pins 138 which underlie and support a pair of outwardly projecting ears 140 affixed respectively to ways 124, whereby said ways are supported. However, post 134 may be pivoted forwardly and downwardly as shown in dotted lines in FIG. 1, to leave the forward ends of the ways unobstructed for the insertion or removal of pipe 8, as will appear.

There is provided a carrier 142 for cutter head 122 at the forward end of ways 124. As best shown in FIG. 5, said carrier includes a pair of ways 144 forming forward extensions of ways 124, ways 144 being long enough to support head 122 thereon, and being rigidly connected by an end plate 146 at their forward ends. Said carrier is supported by a lateral arm 148 affixed at its outer end to a sleeve 150 rotatably mounted at its outer end on a vertical post 152 affixed at its lower end to one of I-beams 4 of the main frame. By means of arm 148, carrier 142 may be positioned in the solid line position of FIG. 5, wherein ways 144 abut the forward ends of ways 124 and form forward extensions thereof, and in which position it may be secured by any suitable means, not shown, or may be pivoted to one side, as shown in dotted lines in FIG. 5, whereby to leave the forward end of the machine unobstructed for the insertion or removal of pipe 8, as will appear.

Cutter head 122 includes a pair of vertically disposed, transversely spaced apart plates 154, said plates being spaced apart by a horizontal longidudinal bar 156 fixed therebetween by screws 158. Said head is best shown in FIGS. 10 and 11. Plates 154 are spaced to move slidably between ways 124, being equipped with guides 160 slidably engaging both the upper and lower edges of each of said ways, and extend both above and below said ways. A pair of cutter wheels 162 are mounted rotatably between plates 154, respectively above and below each other adjacent the forward end of the head, by means of stub axles 164 engaged in said plates. Each wheel includes a series of radially projecting angularly spaced apart tool steel cutter teeth 166. Each tooth has a length, angularly of the wheel, corresponding to the length of the pipe perforation desired. Each tooth is transversely square, and its ends are rounded about axes parallel to the wheel axis, as shown in FIG. 10. Wheels 162 are vertically spaced apart at such a distance that they roll respectively along diametrically opposite longitudinal lines of the interior surface of pipe 8 when the head is moved through the pipe, and teeth 166 pierce the wall of the pipe. The radial projection of teeth 166 from the wheels is equal to the wall thickness of the pipe, plus the desired radial width of the perforation openings 26 in the pipe, or, otherwise stated, equal to the distance it may be desired to offset strip portions 24 of the pipe wall outwardly. The peripheral surface of each wheel 162, at both sides of teeth 166, is knurled as indicated at 168 in FIG. 12. These knurled surfaces directly engage the inner surface of the pipe, and serve a purpose to be described below. The cutter head also carries a pair of smooth roller wheels 170 (see FIGS. 6 and 10) for axial rotation, each roller wheel 170 being spaced rearwardly of one of cutter wheels 162, and adapted to roll against the interior surace of the pipe as the head is moved therethrough.

Spacer bar 156 of the cutter head is extended rearwardly from plates 154 thereof, and is releasably joined by means of a removable vertical pin 172 (see FIG. 10) to a support head 174 also having guides 176 (see FIG. 6) supporting it for sliding movement on ways 124. The forward end of a heavy pull beam 178 is affixed, as by rivet 180, to support head 174, and extends rearwardly axially of pipe 8 between ways 124. Said pull beam is of such length that even when cutter head 122 is positioned on carrier 142, it extends all the way through the pipe and outwardly from the rearward end thereof. Its rearward end is fixed to a carriage 182 (see FIG. 7) supported by rollers 184 on a pair of tracks 186 for movement parallel to the pipe axis. Said rails are disposed at opposite sides of the extended pipe axis, and are affixed respectively to the upper surfaces of a pair of horizontal beams 188 disposed respectively above I-beams 4 of the main frame and affixed thereto by rigid legs 190. Tracks 188 are of such length that carriage 182 may be moved therealong a distance sufficient to cause cutter head 122 to be pulled through pipe 8 the entire distance to which it is desired to perforate said pipe. Normally, for a reason to be described, it is desirable to leave the extreme left end portion of the pipe, as viewed in FIG. 1, unperforated.

A pair of sprocket chains 192 are affixed at their forward ends to carriage 182, and extend horizontally rearwardly therefrom in parallel relation, being trained about a pair of sprockets 194 fixed on a horizontal transverse shaft 196 journalled in bearings 198 mounted at the rearward ends of beams 188. Said chains extend around said sprockets when carriage 182 is in its forwardmost position as shown in FIGS. 1 and 7. To the end of each chain 192 there is affixed a cable 200, said cables extending forwardly, and being trained upwardly and then rearwardly about a pair of pulleys 202 rotatably mounted at the forward end of beams 188, and fixedly attached to carriage 182.

Carriage 182 is powered for movement in both forward and rearward directions by an electric motor 204 mounted beneath beams 188 adjacent the rearward end of the machine. Said motor operates through a hydraulic clutch 206, a geared, plural-speed transmission 208, and a geared speed reducer 210, the output shaft 212 of said reducer having affixed thereon a sprocket 214 which is operatively connected by sprocket chain 216 with a sprocket 218 affixed on shaft 196. There may also be provided an electric brake 220 operable to prevent undesirable over-travel or "coasting" of carriage 182 after the current to motor 204 is shut off.

In the operation of the machine, it is readied for insertion of pipe 8 by operating motor 204 to move cutter head 122 to the forward end of the machine, so that it is upported in ways 144 of carrier 142, while support head 174 is still engaged on ways 124, as shown in FIG. 5, and connector pin 172 is removed. Carrier 142 is then swung to one side as shown in dotted lines in FIG. 5, and post 134 is pivoted downwardly and forwardly as shown in dotted lines in FIG. 1. Also, roller wheels 100 are moved to their dotted line position of FIG. 1 by operation of cylinder 118, and auxiliary frame 32 is raised by operation of cylinders 44 until upper rail 30 is spaced far enough above lower rail 18 to admit pipe 8 freely therebetween. At this time roller wheels 98, carried by the auxiliary frame, are elevated sufficiently to support a pipe carried thereby in spaced relation above lower rail 18, but not to engage a pipe supported by wheels 100 in their present position. A pipe 8 may then be inserted longitudinally of itself into the forward end of the machine, engaging over ways 124. The pipe is supported for free rolling movement on roller wheels 100 during its insertion, and post 128 at the rearward end of rail 18 serves as a backstop limiting the insertion. After insertion of the pipe, post 134 and head carrier 142 may be returned to their normal positions, and connector pin 172 reinserted.

Auxiliary frame 32 is then further elevated, causing roller wheels 98 to engage and lift pipe 8 above roller wheels 100, whereupon the latter may again be returned to their solid line positions of FIG. 1 by reverse operation of cylinder 118. Auxiliary frame 32 is then lowered until the pipe engages and is supported by shear blades 22 of lower rail 18, further until shear blades 22 of upper rail 30 engage the pipe, and still further until the pipe is slightly flattened and cross bars 36 of the auxiliary frame engage the upper ends of screws 58. As previously discussed, the slight flattening of the pipe tends to insure continuous linear contact between the shear blades and the pipe despite slight irregularities of the pipe. The use of screws 58 insures accurate parallelism between the upper and lower shear blades, and furthermore provides a uniform vertical pipe dimension despite slight variations of pipe diameter, said uniform vertical dimension being necessary for proper cooperation with the cutter head, as will appear.

Perforation of the pipe is then begun by actuating motor 204 to draw or pull carriage 182 rearwardly, causing pull beam 178 to move cutter head 122 into and longitudinally through pipe 8. As it moves through the pipe, the knurled peripheries 168 of upper and lower cutter wheels 162 roll along diametrically opposite longitudinally extending lines of the interior pipe surface, as shown in FIG. 10, the knurled peripheries engaging the pipe to indent said pipe wall. The accurate vertical sizing of the pipe provided by screws 58 permits this relationship to be obtained with no necessity of providing yieldable mountings for cutter wheels 162 in head 122. As the cutter head moves through the pipe, the teeth 166 thereof, in cooperation with the associated shear blades 22, form the desired perforations in the pipe wall, the peripheral edges of each tooth forming a pair of short longitudinal slits in the pipe wall, and the body of the tooth offsetting the strip 24 of wall between said slits radially outwardly between the associated blades 22, against the spacer plate 28 between said blades, as shown in FIG. 11. As long as the outward offset of strips 24 is greater than the wall thickness of the pipe, this forms the perforation openings 26 along each side of strip 24, as best shown in FIGS. 13 and 14. The ends of of strips 24 are not cut free, since the angularly spaced ends of each tooth are rounded, not sharp. Thus the outward offset of the strips is accomplished by permanent deformation of their end portions. The knurling 168 of the cutter wheels prevents angular slippage of said wheels against the pipe walls. Such slippage, if allowed to occur, could cause uneven longitudinal spacing of the perforations, or even cause teeth 166 to cut continuous slots in the pipe wall. Continuous downward pressure is maintained throughout the perforating operation by cylinders 44, in order to resist the great spreading force exerted on rails 18 and 30 by the cutter wheels and their teeth.

While it would be possible to perforate the entire length of pipe 8, it is desirable to terminate the perforation somewhat forwardly of the rearward end of the pipe, for the reason that as shown the cutter head must be returned forwardly through the pipe, and if allowed to emerge form the rearward end of the pipe, cutter wheels 162 might turn or spin when out of engagement with the pipe, so that when returned forwardly through the pipe their teeth could be out of phase with their positions during their rearward trip, and the pipe might be continuously slotted. By terminating the perforation somewhat short of the rearward end of the pipe, and then reversing it for forward movement by reversing the power train of motor 204, the cutter wheel teeth will track accurately in the perforations they formed on their rearward passage, knurling 168 again preventing slippage.

After the cutter head has been returned to its original position at the forward end of the machine as just described, cylinders 44 are actuated to raise auxiliary frame 32 and upper rail 30. The initial upward movement of rail 30 pulls shear blades 22 thereof free of the offset pipe strips 24 of the top line of perforations, and continued upward movement causes roller wheels 98 to engage and lift pipe 8, pulling offset pipe strips 24 of the lower line of perforations from between blades 22 of lower rail 18. The pipe may then be freely rotated on its axis, rolling on wheels 98, and angularly indexed by any suitable means, not shown, to position it for the formation of another pair of diametrically opposite lines of perforations by the next passage of cutter head 122 therethrough. The process as described is repeated until the entire circumference of the pipe is perforated. After perforation is completed, the pipe is removed from the machine by reversing the process of insertion already described.

The particular type of perforation formed by the present machine has certain advantages in the finished pipe, in its use as well casing, regardless of the machine used to form it. The planes of the perforation openings 26 are disposed radially of the pipe, not arranged to extend over and occupy portions of the pipe wall area. This permits the formation of perforations having a very large flow area, in proportion to the area of the pipe wall itself, and this is usually to be desired. Also, openings 26 have the form of long but narrow slits. This permits the provision of a large flow area, as mentioned above, while still preventing the entry of sand, gravel and the like into the pipe. The size of solid particles which may enter the pipe is of course limited by the width of openings 26, and this width may be regulated as desired by the proper selection of the cutter wheels 162 and their associated parts.

While we have shown and described a specific embodiment of our invention, it will be readily apparent that many minor changes of structure and operation could be made without departing from the spirit of the invention.

What we claim as new and desire to protect by Letters Patent is:

1. A machine for perforating a cylindrical pipe comprising:
   a. a main frame,
   b. a straight shear blade carried rigidly by said frame,
   c. supporting means carried by said frame and operable to support said pipe against said shear blade, said blade extending longitudinally of said pipe and engaging the exterior surface thereof,
   d. a cutter head supported by said frame for movement through said pipe,
   e. a cutter wheel carried rotatably by said head on an axis transverse to said pipe and positioned to roll against the interior surface of said pipe in alignment with said shear blade as said head is moved through said pipe,
   f. a series of angularly spaced, radially projecting teeth carried fixedly by said cutter wheel, and
   g. power means carried by said frame and operable to move said cutter head through said pipe, whereby said teeth and said shear blade cooperate to form perforations in the wall of said pipe.

2. A machine as recited in claim 1 including a pair of said shear blades arranged in closely spaced apart parallel relation and so positioned that both engage said pipe, and wherein each tooth of said cutter wheel cooperates with said shear blades to cut a pair of parallel slits in the wall of said pipe, and to offset the strip of the pipe wall intermediate said slits radially outwardly by a distance greater than the wall thickness of said pipe, whereby to open narrow rectangular openings between each longitudinal edge of said strip and the adjoining edge of the standing portion of the pipe wall.

3. A machine as recited in claim 2 wherein the operative edges of said shear blades are substantially square in cross-sectional contour and are spaced transversely apart by a distance corresponding to the transverse width of the teeth of said cutter wheel, said teeth being operable to cut through the pipe wall and enter between said shear blades as said cutter head is moved through said pipe, each of said teeth being substantially square in transverse cross-sectional contour, the major portion of its angular extent being arcuately concentric with said cutter wheel, and having its extreme angular end portions rounded about axes parallel to the rotative axis of said cutter wheel, the radius of curvature of said end portions being less than the radius of said wheel.

4. A machine as recited in claim 3 wherein the radial projectionof each of said teeth from said cutter wheel is generally equal to the wall thickness of said pipe, plus the radial width desired of said narrow rectangular openings to be formed.

5. A machine as recited in claim 4 with the addition of a spacer plate interposed between said shear blades with the face thereof confronting the opening netween said blades recessed below said opening by a distance generally equal to the radial projection of said teeth from said cutter wheel.

6. A machine as recited in claim 5 wherein the peripheral surface of said cutter wheel which engages the interior surface of said pipe is roughened directly adjacent the transverse sides of the teeth carried by said wheel, whereby to provide a positive non-slip rolling engagement of said wheel against said pipe wall.

7. A machine as recited in claim 2 with the addition of:
   a. a second pair of shear blades carried by said frame and operable to engage the exterior surface of said pipe along longitudinal lines diametrically opposite to said first pair of shear blades, and
   b. a second toothed cutter wheel carried rotatably by said cutter head and operable to roll along the interior surface of said pipe in cooperative relationship with said second pair of shear blades as said head is moved through said pipe.

8. A machine as recited in claim 7 wherein said main frame includes an elongated horizontal lower rail, said first pair of shear blades being fixed in the upper edge of said lower rail, and wherein said supporting means comprises;
   a. an auxiliary frame carried for vertical movement by said main frame, and including a horizontal upper rail disposed in aligned relation above said lower rail, said second pair of shear blades being fixed in the lower edge of said upper rail, and
   b. power elevating means carried by said main frame for raising and lowering said auxiliary frame with respect thereto, whereby said auxiliary frame may be lowered to grip said pipe between said first and second pairs of shear blades, and raised to free said pipe for insertion or removal.

9. A machine as recited in claim 8 with the addition of pipe support members carried by said auxiliary frame and spaced below said pipe when said pipe is gripped between said first and second pairs of shear blades, whereby as said auxiliary frame is raised, said second pair of shear blades are first lifted away from said pipe, and said pipe support members then engage and lift said pipe away from said first pair of shear blades.

10. A machine as recited in claim 9 wherein said pipe support members constitute roller wheels carried by said auxiliary frame for rotation on axes parallel to said shear blades, whereby when said pipe is supported only by said roller wheels, it may be rotated about its axis to index it angularly with respect to said shear blades.

11. A machine as recited in claim 8 wherein said power elevating means is operable to maintain a strong downward pressure on said auxiliary frame as said cutter head is moved through said pipe, whereby to prevent vertical spreading of said upper and lower rails, and with the addition of fixed stop members carried by said main frame and operable to limit the downward movement of said auxiliary frame.

12. A machine as recited in claim 11 wherein said cutter wheels are vertically spaced apart at such a distance as to perforate a pipe having a slightly smaller diameter than the pipe actually to be perforated, and wherein said power elevating means is operable to lower said auxiliary frame with sufficient force to flatten said pipe vertically between said shear blades, said stop members being positioned to arrest the downward movement of said auxiliary frame when the vertical dimension of said pipe has been reduced sufficiently to cooperate effectively with said cutter wheels.

13. A machine as recited in claim 8 wherein said main frame includes horizontally extending guideways intermediate said upper and lower rails, whereby to extend through said pipe parallel to the axis thereof, said cutter head being mounted slidably on said guideways, and with the addition of:
   a. a series of roller wheels carried by said main frame in longitudinally spaced relation therealong, and at either side thereof, and
   b. means carried by said main frame for selectively raising said roller wheels to a position wherein they support said pipe in spaced relation above said lower rail, said roller wheels being rotatable about horizontal axes transverse to said rails, whereby a pipe supported thereon may be moved longitudinally of itself into a position intermediate said upper and lower rails and encircling said guideways.

14. A machine as recited in claim 8 wherein said main frame includes:
   a. horizontally extending guideways intermediate said upper and lower rails, whereby to extend through said pipe parallel to the axis thereof, both said lower rail and said guideways being of such length as to extend outwardly from both ends of said pipe,
   b. a first post fixed at its lower end to said lower rail, at one end thereof, and at its upper end to said guideways, and
   c. a second post pivoted at its lower end to the opposite end of said lower rail, and releasably engaging, at its upper end, the opposite ends of said guideways in supporting relation thereto, said second post being pivotal to a positon in which it leaves the adjacent ends of said guideways unobstructed for the longitudinal introduction of a pipe over said guideways.

15. A machine as recited in claim 14 with the addition of a cutter head carrier including guideways forming extensions of said first-named guideways at the ends thereof supported by said pivoted post, and operable to receive and support said cutter head, said cutter head being detachable from said means for moving it through said pipe along said guideways, said carrier being pivotally mounted on said main frame for movement to a position in which it leaves the adjacent ends of said first-named guideways unobstructed for the longitudinal introduction of a pipe over said first-named guideways.

16. A machine as recited in claim 8 wherein said means for moving said cutter head through said pipe comprises:
   a. tracks carried fixedly by said main frame and extending longitudinally from one end of said upper and lower rails, in parallel relation thereto,
   b. a carriage mounted for rolling movement along said rails,
   c. a substantially rigid beam affixed at one end to said carriage and extending horizontally between said upper and lower rails whereby it extends through said pipe, and attached at its opposite end to said cutter head, said beam being of such length as to extend through the full length of said pipe, and
   d. power means carried by said main frame and operable to drive said carriage selectively in either direction along said tracks.

17. A machine as recited in claim 16 wherein said cutter head, preparatory to movement thereof through said pipe to perforate said pipe, is disposed outwardly from the end of said pipe opposite to the end thereof at which said carriage is disposed, whereby said pipe is perforated as said cutter head is pulled, rather than pushed, therethrough by said beam.

* * * * *